United States Patent Office 2,965,545
Patented Dec. 20, 1960

2,965,545

PRODUCTION OF LYSINE

Harry Pearson Broquist and John A. Brockman, Jr., Woodcliff Lake, N.J., assignors to American Cyanamid Company, New York, N.Y., a corporation of Maine No Drawing. Filed Aug. 19, 1957, Ser. No. 679,058

7 Claims. (Cl. 195—30)

This invention relates to l-lysine, an essential amino acid, and to methods of producing lysine. More particularly, the invention relates to the production of l-lysine by a process in which 5-formyl-2-oxovaleric acid is used as a precursor of l-lysine.

A number of foods, particularly those containing cereal grains or products derived therefrom, are deficient in the essential amino acid, l-lysine. Essential amino acids are those which are required by animals for their proper maintenance and growth. The animal body is not able to synthesize these amino acids which are necessary for the formation of animal protein. There are a number of essential amino acids; and, fortunately, most protein matter is made up of a balance of these so that when this protein is consumed, there is a sufficient supply of the proper amino acids after digestion to reconstitute the protein matter necessary for the animals' growth. Although most protein matter of animal origin contains an adequate balance of essential amino acids and while some protein matter of vegetable origin is adequate for proper growth of the animals, there is a very large number of foodstuffs which are lacking in protein which will yield all of the essential amino acids. This is particularly true of proteins derived from cereal grains such as rice, wheat and corn. In recent years, it has become apparent that many foods consumed by animals, which term includes man, need to be supplemented with l-lysine in order to give them a proper balance of essential amino acids whereby these foods can be more effective in the maintenance and growth of the animal body.

Although l-lysine can be produced synthetically and by fermentation processes involving bacteria, these processes are quite expensive and tend to limit the use of lysine as a food supplement. It is desirable, therefore, that a cheap method of producing l-lysine in a form suitable for addition to animal food be made available. This is accomplished by the present invention.

We have discovered that yeast cells have the ability to produce lysine

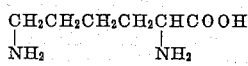

from 5-formyl-2-oxovaleric acid

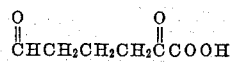

Although it is known that l-lysine can be produced by certain microorganisms using certain specific precursors, such as diaminopimelic acid, we believe that we are the first to discover that the enzymes of yeast have the abiilty to convert 5-formyl-2-oxovaleric acid to l-lysine in amounts far in excess of the requirements of the yeast cell for its protein content. In other words, free l-lysine can be extracted from the aqueous nutrient medium in which the cells are grown as well as from the yeast cells without the necessity of hydrolysis of the yeast protein to liberate the l-lysine. The amount of l-lysine that is produced can be very high; and since 5-formyl-2-oxo- valeric acid can be readily synthesized in unlimited quantities at low costs, our new process provides a means of obtaining l-lysine cheaply and in unlimited quantities.

5-formyl-2-oxovaleric acid appears to be a new compound, but a method of synthesizing this material is described in the copending application of Brockman and Fabio, Serial No. 679,057, filed August 19, 1957, now Patent No. 2,891,988, for an improvement in 5-Formyl-2-Oxovaleric Acid, Its Salts and Esters and a Process of Producing the Same.

One of the most important advantages of the invention is derived from the fact that yeast has been grown on a commercial basis for many years as a source of animal food. It is not necessary, therefore, to develop any new techniques or equipment to provide l-lysine in an edible form. If desired, the entire fermentation liquor resulting from the propagation of the yeast cells in a medium containing 5-formyl-2-oxovaleric acid can be simply added to animal feeds with no treatment whatsoever to increase the nutritive value of these feeds by the relatively large amounts of lysine contained in the whole fermented mash. This fermented mash may be dried and packaged and sent to wherever it may be needed. Alternatively, the yeast cells may be separated from the mash, washed and dried and used wherever yeast cells are now used as food supplements. The new yeast produced by the process of the present invention are particularly effective in this regard in that instead of containing only 3 to 4 percent of l-lysine, most of which is bound in a protein form, the new yeast cells produced in accordance with the process to be described hereinafter may contain as much as 20 percent of l-lysine most of which is in the form of free lysine.

Of course, if desired, the yeast cells of the present invention may be treated to release the lysine content thereof and free l-lysine in substantially pure form may be recovered therefrom for such uses as require essentially pure lysine.

Although a preferred method of practicing the invention is to add 5-formyl-2-oxovaleric acid to a yeast fermentation and allow it to be converted to l-lysine by the yeast enzymes simultaneously with the production of new yeast cells, the enzymes contained in resting yeast cells can also convert this precursor to l-lysine. All that is necessary in this embodiment of the invention is to mix 5-formyl-2-oxovaleric acid with yeast cells in an aqueous suspension and allow the enzymes which are contained in the yeast cells to effect the conversion preferably while the mixture is agitated and aerated. This conversion by resting yeast cells takes place over a pH range of from 2.5 to 8.5, preferably 3.0 to 5.0, over a wide range of temperatures, for instance from 5° C. to 50° C. Substantial conversion is effected within 24 hours at room temperature, although the period of time may range from as little as one hour to forty-eight hours or more depending upon the pH, temperature, rate of aeration, agitation, and other factors.

A further embodiment of the invention which would not normally be used in the commercial production of lysine is to rupture the yeast cells by chemical or physical means to liberate the enzymes contained therein and add 5-formyl-2-oxovaleric acid so that it may be converted by the enzymes in the solution to the desired l-lysine.

While we have indicated above that 5-formyl-2-oxovaleric acid is converted to the l-lysine by the action of yeast enzymes, we wish to point out that the mechanism of the conversion is not definitely known. In fact, some mechanism other than enzyme action may be involved. On the basis of experimental evidence, however, it appears that the conversion is a result of enzymes, probably more than one, and by several stages. We do not wish, therefore, to be bound by any theory. The facts are that 5-formyl-2-oxovaleric acid is converted to l-lysine by a biosynthesis in excellent yields by the action of yeast cells.

EXAMPLE

A synthetic medium was prepared with the following components:

Table I

| Ingredient | Synthetic Medium— Grams/Liter Final Strength Medium |
| --- | --- |
| Dextrose | 50 |
| $KH_2PO_4$ | 0.3 |
| $MgSO_4$ | 0.1 |
| Aspartic Acid | 0.2 |
| Glutamic Acid | 0.2 |
| $(NH_4)_2SO_4$ | 3.8 |
| Sodium Citrate Buffer [1] | 50 ml. |
| Vitamin Solution [2] | 10 ml. |
| Water to 1 liter. | |

[1] Sodium citrate buffer:
    100 grams sodium citrate.
    20 grams citric acid.
    Water to 1 liter.
[2] Vitamin solution:
    Thiamine, 20.0 milligrams.
    Biotin, 0.2 milligram.
    Pyridoxine, 20.0 milligrams.
    Calcium pantothenate, 20.0 milligrams.
    Inositol, 200.0 milligrams.
    Nicotinic acid, 20.0 milligrams.
    Water to 40 ml.

Portions of the above-described synthetic medium were placed in fermentation vessels and sterilized. To some of these was added aseptically varying amounts of 5-formyl-2-oxovaleric acid as indicated in the table below. Others served as controls. The fermentation vessels were inoculated with 24- to 28-hour cultures of growing yeast cells. Strains Y–80 and Y–416 in the table were *Saccharomyces cereviseae*. Strains Y–3 and Y–4 were unidentified species of Saccharomyces. The fermentation vessels were then incubated for 72 hours at about 24° C. on a reciprocal shaker. At the end of the fermentation period, the contents of the vessels were steamed for ten minutes to rupture the yeast cells and liberate the free l-lysine contained therein. The fermented liquor was centrifuged and the supernatant liquor was analyzed for its l-lysine content by a microbiological method described by Steel et al. in the Journal of Biological Chemistry, 177, page 533 (1949). The results of this series of fermentations are shown in the table below.

Table II

| KAAL/Ml. | Yeast Strain | | | |
| --- | --- | --- | --- | --- |
| | Y-80 | Y-3 l-Lysine | Y-4/Ml. | Y-416 |
| None | 42 | 3 | 6 | 6 |
| 125 | | 3 | 3 | 6 |
| 150 | 68 | | | |
| 250 | | 29 | 22 | 62 |
| 500 | 190 | 40 | 34 | 80 |
| 1,600 | 136 | | | |

The above results show that the enzymes of yeast have the capacity to convert 5-formyl-2-oxovaleric acid to l-lysine. A synthetic medium was used to illustrate this action in view of the fact that media containing naturally occurring substances contain a large number of different components, several of which serve as precursors of lysine. When producing l-lysine on a commercial basis with 5-formyl-2-oxovaleric acid as a precursor, the preferred embodiment would be to add to a quantity of the fermentation medium an amount of precursor up to about 2 percent by weight and allow the fermentation to proceed in a normal manner. Any suitable yeast fermentation used for the production of yeast cells on a commercial basis may be used. One of the most desirable processes employs the yeast *Torulopsis utilis* with a fermentation medium characterized by the use of waste sulfite liquor. This process of producing yeast cells has been described in numerous patents and publications, and details of the actual fermentation appear to be unnecessary. The only modification required to increase the free l-lysine content of the resulting yeast cells is to add 5-formyl-2-oxovaleric acid at a period of time of at least one hour before the cells are harvested. It will be understood, of course, that yeast cells of both the Endomycetaceae and Cryptococcaceae families and those of their several genera also contain enzymes which have the ability to convert 5-formyl-2-oxovaleric acid to l-lysine. Such yeast cells upon being harvested can be mixed with animal feeds of various kinds to increase the lysine content thereof making these foods more effective nutrient elements for both man and beast.

We claim:
1. A method of preparing free l-lysine which comprises subjecting 5-formyl-2-oxovaleric acid in an amount from 250 γ/ml. and not more than two percent by weight to the action of the enzymes of yeast at a pH between 3.0 and 5.0 and at a temperature of between 5° C. and 50° C.

2. A method of preparing free l-lysine which comprises a step of subjecting 5-formyl-2-oxovaleric acid in an amount from 250 γ/ml. to two percent to contact with yeast cells at a pH of 3.0 to 5.0 at a temperature of from 5° C. to 50° C.

3. A method of preparing free l-lysine which comprises a step of adding from 250 γ/ml. to two percent of 5-formyl-2-oxovaleric acid to an aerobic yeast fermentation at a pH of 3.0 to 5.0 at a temperature of 5° C. to 50° C. whereby conversion of 5-formal-2-oxovaleric acid into free lysine takes place.

4. A method according to claim 2 in which the yeast cells are of the genera Saccharomyces.

5. A method according to claim 4 in which the Saccharomyces is *Saccharomyces cereviseae*.

6. A method according to claim 2 in which the yeast cells are of the genera Torulopsis.

7. A method according to claim 6 in which the species of Torulopsis yeast is *Torulopsis utilis*.

References Cited in the file of this patent

UNITED STATES PATENTS 2,313,275     Schopmeyer     Mar. 9, 1943

OTHER REFERENCES

Advances in Enzymology, vol. 16, 1955, pp. 295–304, by F. F. Nord, Interscience Publishers Inc., New York.

Annual Review of Biochemistry, vol. 24 (1955), pp. 284–285.

J. Biol. Chem., vol. 213 (1955), pp. 355–363.

Biochemistry of Amino Acids, by Meister, Academic Press Inc., New York (February 1957), pp. 359–361.